United States Patent Office 2,888,940
Patented June 2, 1959

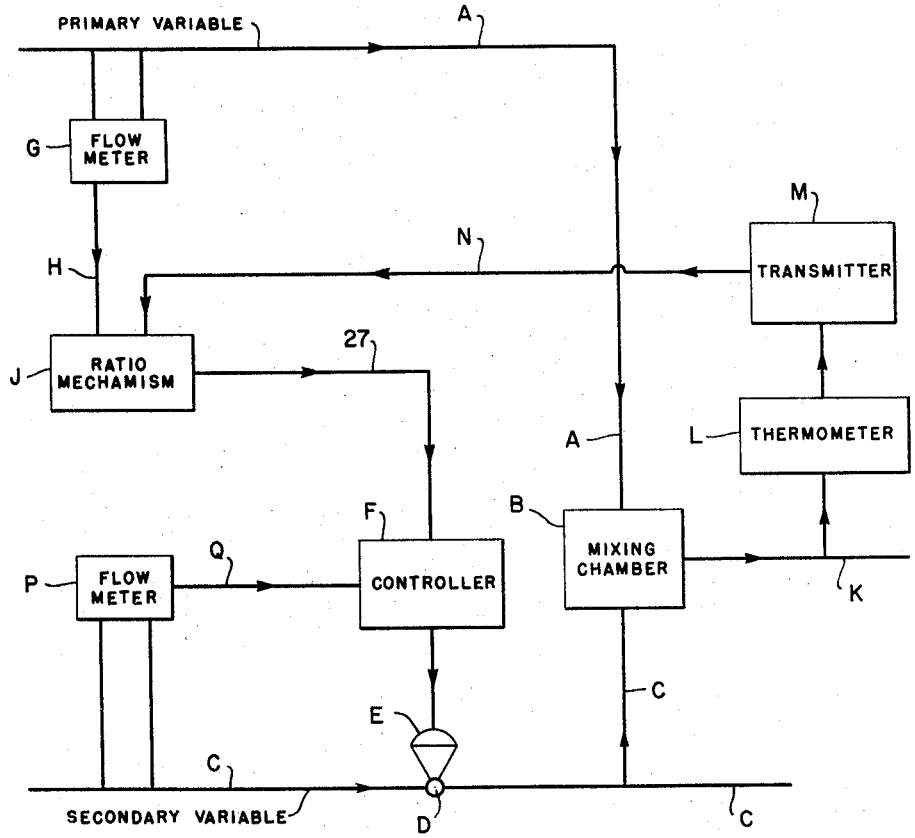

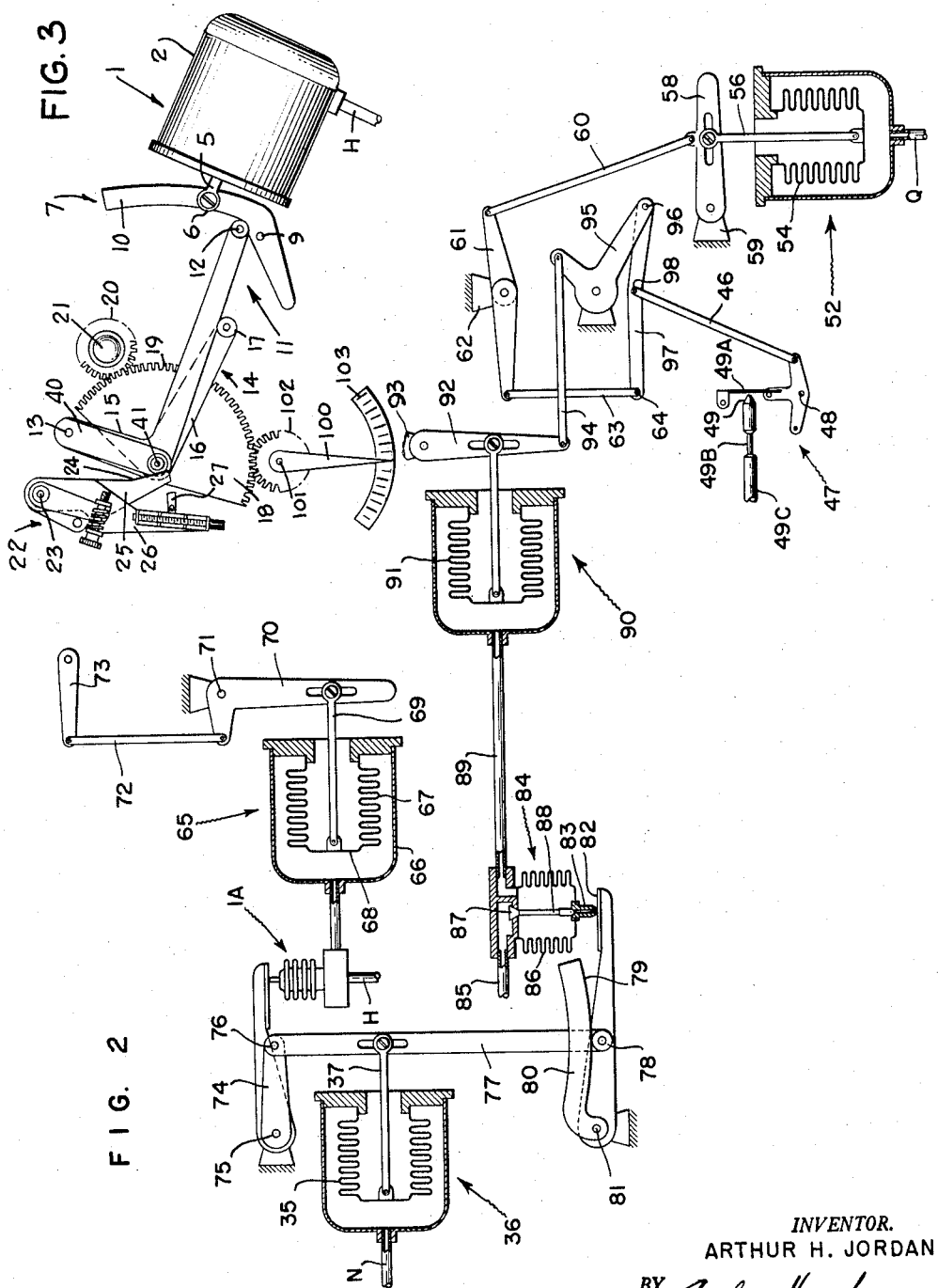

2,888,940

RELAY FOR MAINTAINING A CONSTANT RATIO BETWEEN A PRIMARY VARIABLE AND A SECONDARY VARIABLE IN RESPONSE TO A TERTIARY VARIABLE

Arthur H. Jordan, Bala-Cynwyd, Pa., assignor to Minneapolis-Honeywell Regulator Company, Minneapolis, Minn., a corporation of Delaware Original application September 10, 1953, Serial No. 379,456, now Patent No. 2,788,013, dated April 9, 1957. Divided and this application September 6, 1956, Serial No. 608,402

4 Claims. (Cl. 137—82)

In industrial process control it is often necessary to ratio or to proportion one variable, called the secondary variable, with another, called the primary variable. The primary variable generally is uncontrolled and varies with plant or production requirements. A controller is provided which is responsive to the primary and to the secondary variables and which controls the secondary variable. The input of the primary variable to the controller is varied so as to maintain the ratio between the primary and secondary variables constant. This variation of the input of the primary variable to the controller is done by means of a tertiary variable.

Such ratio control systems have a number of applications in the chemical and process industries for such purposes as: rationing the flow of absorber oil to rich gas in natural gas absorption plants, the rationing of gas and air mixtures in combustion work, and the proportioning of chemicals in alkalization plants.

Such ratio controllers can be used on any continuous process where it is desired to control a temperature, pressure, rate of flow of liquids or gases, or liquid level at a fixed ratio to another measured variable.

It is an object of this invention to provide such a ratio control system including means whereby the output of the primary variable, which output forms one input to a controller governing the secondary variable, is modified by the tertiary variable so that their joint output is the product of the primary and tertiary variables.

More specifically, it is an object of this invention to provide a mechanical linkage having an input, generally in the form of an air-operated motor. This motor causes a lever having an arm to rock about a fixed pivot. An intermediate lever has pivotal connection with this arm of said first mentioned lever, this pivotal connection providing a floating pivot for the intermediate lever. An output lever is pivoted about a second fixed pivot spaced from the first pivot and has an arc-shaped surface engaged by the unpivoted end of the intermediate lever. A second air-operated motor is responsive to variations in a tertiary variable and is connected to said intermediate lever so as to oscillate that intermediate lever about its floating pivot. This moves the unpivoted end of the intermediate lever along the arc-shaped surface of the output lever.

An air-operated relay is connected under the control of an arm of the output lever so that the output pressure of said relay varies in accordance with the oscillations of the output lever. An air-operated receiver is connected to receive the output of said relay and is actuated thereby. A linkage is driven by this receiver and produces the output of the apparatus.

A better understanding of the present invention may be had from the following detailed description when read in connection with the accompanying drawings in which:

Fig. 1 is a block diagram;

Fig. 2 is a schematic, exploded view showing one modification of the invention; and Fig. 3 is a front elevation of a second modification.

Although the primary, secondary, and tertiary variables may be of many different sorts, since by far the major application of such ratio control systems is the ratioing of one flow to another, the apparatus will be described using flow control as an example.

Fig. 1 is a block diagram showing a conduit A through which the primary variable flows to a mixing chamber B where it is mixed with the secondary variable, which flows through a conduit C under the control of a valve D, which is governed by a motor E, such as an air-operated motor, mounted under the control of a controller F, such as an air-operated controller. A flow meter G measures the primary variable and transmits, by conduit H, the primary variable to the ratio mechanism J. From the mixing chamber B, the tertiary variable flows through conduit K, where it is measured by means of thermometer L. Transmitter M converts this temperature to an air pressure, which is conveyed by conduit N to the ratio mechanism J. The secondary variable in conduit C is measured by flow meter P and transmitted by conduit Q to the controller F. Controller F may conveniently be of a well known, commercial type, one embodiment of which is shown in U.S. Patent 2,125,081, patented July 26, 1938, to C. B. Moore. For further details of controller F, reference is made to Patent 2,125,081.

The modification of Fig. 2

In the modification of Fig. 2 the primary variable is introduced through conduit H to the motor, generally indicated at 1A. The air pressure in conduit H is also conducted to a receiver, generally indicated at 65, and comprising a cup-shaped, rigid casing 66 to which one end of a flexible bellows 67 is attached. The free end 68 of this bellows is pivoted to a link 69 which is pivoted to an input, bell crank lever 70 mounted on a stationary pivot 71 and having connection, by means of link 72, with a lever 73, to which the primary pen shaft and the primary pen (not shown) are attached.

The freely movable end of motor 1A bears on a bell crank lever 74 mounted on stationary pivot 75 and having pivotal connection at 76 with one end of an intermediate lever 77 which carries, at its opposite end, a roller 78 engaging the arc-shaped surface 79 of an output, bell crank lever 80 mounted on a stationary pivot 81. A flat face 82 of bell crank lever 80 bears against the exhaust port 83 of a pilot valve or relay, generally indicated at 84.

A source 85 of fluid under pressure is connected to control chamber 86 of relay 84 under the control of inlet valve 87, which is connected to an outlet valve 88 controlling the exhaust of fluid through exhaust port 83. Chamber 86 communicates through pipe 89 with a receiver, generally indicated at 90, having a flexible bellows 91 adapted to rock lever 92 around its stationary pivot 93 and thus actuate link 94 and bell crank 95, so as to rock the free end 96 of a floating lever 97. At intermediate point 98 of lever 97 is connected link 46 which connects with the flapper, which controls the operation of the controller F.

The tertiary variable, in the form of a variable air pressure, enters the motor, generally indicated at 36, through the pipe N and, by means of bellows 35 and link 37, rocks lever 77 about its floating pivot 76 and, consequently, moves roller 78 toward or away from the stationary pivot 81.

The secondary variable, in the form of a variable air pressure, is introduced through pipe Q to the motor, generally indicated at 52, and, by means of bellows 54 and link 56, rocks lever 58 about its stationary pivot 59, so as to actuate link 60, lever 61 (pivoted at 62), link 63, and end 64 of floating lever 97.

*Operation of the modification of Fig. 2*

Variations in the primary variable cause the air pressure applied to the conduit H to vary. The variations in this air pressure cause motor 1A to move at its free end and thereby to rock bell crank lever 74 about its stationary pivot 75 and likewise to rock pivot 76 about stationary pivot 75. This rocking movement of pivot 76 causes intermediate lever 77 to move longitudinally. The engagement between roller 78 and the arc-shaped surface 79 of output lever 80 causes lever 80 to rock about its stationary pivot 81. The amount of this rocking depends upon the distance between the stationary pivot 81 and the roller 78. The rocking movement of output lever 80 causes its surface 82 to move and to actuate relay 84 by opening inlet valve 87 or by opening exhaust valve 88 and thereby causing the output pressure in chamber 86 to vary. The output pressure from relay 84 is transmitted through conduit 89 to receiver 90. A change in the pressure in receiver 90 causes the flexible bellows 91 to move and thereby actuate lever 92 about its stationary pivot 93 and causes lever 94 to rock crank lever 95 and thereby to move the right hand end of whiffletree 97. This movement of the right hand end of whiffletree 97 causes its intermediate point 98 to move the left hand end 64 as a pivot. This movement of intermediate point 98 causes link 46 to rock the three-armed lever 47 about its stationary pivot 48 and moves flapper 49A relative to nozzle 49 with the consequent operation of the controller F.

The tertiary variable governs the air pressure entering conduit N and receiver 36. Changes in this air pressure cause movement of bellows 35 and consequent movement of link 37 which is connected to intermediate lever 77 between the ends thereof. This movement of intermediate lever 77 is a rocking movement about its floating pivot 76 and thereby causes roller 78 to move toward or away from the stationary pivot 81 on which the output lever 80 is mounted. If roller 78 is close to stationary pivot 81, the longitudinal movement of intermediate lever 77 causes but a small, rocking movement of output lever 80. However, if roller 78 is at a maximum distance away from stationary pivot 81, the longitudinal movement of intermediate lever 77 causes a maximum, rocking movement of output lever 80. In this way, the tertiary variable maintains the ratio between the primary variable introduced at H and the secondary variable introduced at Q.

Changes in the secondary variable cause changes in the air pressure applied to the inlet pipe Q and thus actuate the third air-operated motor, generally indicated at 52, by causing the bellows 54 to move link 56 and thereby move intermediate lever 58 at its stationary pivot 59. Movement of third motor 52 is thus transmitted by bellows 54, link 56, lever 58, link 60, lever 61, link 63, to the left hand end 64 of whiffletree 97. Movement of the left hand end 64 of whiffletree 97 causes whiffletree 97 to rock about its right hand end 96 as a pivot. This rocking movement also causes rocking movement of the intermediate point 98 of the whiffletree and consequent movement of the link 46 and the three-armed lever 47 about its stationary pivot 48 so as to move flapper 49A relative to nozzle 49 and thus operate controller F in a well known manner. Reference has already been made to Patent 2,125,081 for a description of the operation of controller F.

*Modification of Fig. 3*

In this modification the primary variable is introduced through pipe H to a motor, generally indicated at 1. Motor 1 comprises a rigid, cup-shaped casing 2 in which is mounted a movable member (not shown). Link 5 is the reciprocable output member of motor 1 and is pivoted at 6 to a first lever, generally indicated at 7, and pivoted on a stationary pivot 9.

A second lever, generally indicated at 11, bears at one end a roller 12 in contact with an arcuate surface 10 of lever 7.

The opposite end of lever 11 bears against one face 24 of one arm 25 of a bell crank lever, generally indicated at 22. Lever 22 is a third lever mounted on a stationary pivot 23 and having an arm 26, which may be manually adjusted relative to arm 25 and then locked in its adjusted position. Arm 26 has pivotally attached thereto link 27, which is connected to the flapper of controller F by the linkage shown in Fig. 2.

A fourth lever is generally indicated at 14, and is mounted on a stationary pivot aligned with rotatable pivot 41 and therefore invisible in Fig. 3. Lever 14 has a sector 18 having at its curved edge gear 19, which meshes with gear 20 on a pivoted handle 21. The fourth lever 14 has an arm 15 projecting away from the stationary pivot of lever 14 and carrying a rotatable pivot 13 connected at one end of a supporting link 40. The other end of supporting link 40 carries, by means of a rotatable pivot 41, the end of lever 11 remote from roller 12. The pivot 41 overlies the stationary pivot or lever 14 and forms a floating pivot for lever 11.

A pointer 100 is pivoted at 101 and carries gear 102 which meshes with gear 19. The free end of pointer 100 cooperates with scale 103, which indicates, as does gauge 50, that ratio between the primary and secondary variables, which the controller is set to maintain.

*Operation of the modification of Fig. 3*

Changes in the air pressure responsive to the primary variable are transmitted through pipe H to motor 1 and serve to oscillate lever 7 about its fixed pivot 9. Handle 21 may be rotated so as to turn sector 18 by means of gears 20 and 19. Sector 18 forms part of lever 14 so that rotation of lever 14 causes roller 17 to move roller 12 toward or away from the fixed pivot 9 of lever 7. Depending upon the distance between fixed pivot 9 and roller 12, lever 11 is moved a greater or lesser amount for any particular movement of motor 1. Pointer 100 indicates, by reference to scale 103, what is the proportion or ratio of the input of this ratio mechanism to its output.

This application is a division of co-pending application Serial No. 379,456, filed September 10, 1953, U.S. Patent 2,788,013, patented April 9, 1957.

What is claimed is:

1. An air-operated apparatus producing an output in response to variations in a primary variable, said output being automatically maintained at a preselected ratio between said primary variable and a secondary variable, said apparatus including, an air-operated motor responsive to variations in a primary variable, an input lever pivoted about a first stationary axis and connected so as to be oscillated by said first motor about said first axis, an intermediate lever having a pivotal connection with an arm of said input lever, the said pivotal connection providing a floating pivot for said intermediate lever, an output lever pivoted about a second fixed axis spaced from said first fixed axis and having an arc-shaped surface engaged by the unpivoted end of said intermediate lever, a second air-operated motor responsive to variations in a tertiary variable and connected to said intermediate lever to oscillate said intermediate lever about its floating pivot and to thereby move the unpivoted end of said intermediate lever along said arc-shaped surface, an air-operated relay connected under the control of an arm of said output lever so that the output pressure of said relay varies in accordance with the oscillations of said output lever, an air-operated receiver connected to receive the output of said relay and to be actuated thereby, and a linkage driven by said receiver to produce the output of the apparatus.

2. A relay for maintaining constant the ratio between a primary variable and a secondary variable in response to the variations of a tertiary variable, including, an input lever pivoted to turn about a first stationary axis, an intermediate lever having one end pivoted to said input lever at a floating pivot and having a roller at its opposite end, an output lever pivoted about a second fixed axis spaced from said first fixed axis and having an arc-shaped surface engaged by the roller on said intermediate lever, a second air-operated motor responsive to variations in a tertiary variable and connected to said intermediate lever to oscillate said intermediate lever about its floating pivot and to thereby move the roller on said intermediate lever along said arc-shaped surface, an air-operated relay connected under the control of an arm of said output lever so that the output pressure of said relay varies in accordance with the oscillations of said output lever, an air-operated receiver connected to receive the output of said relay and to be actuated thereby, and a linkage driven by said receiver to produce the output of the apparatus.

3. A relay for maintaining a constant ratio between a primary variable and a secondary variable in response to the variations of a tertiary variable, including, an input lever pivoted to turn about a first stationary axis, an intermediate lever having one end pivoted to a portion of said input lever to provide a floating pivot and having a roller at the other end thereof, an output lever having an arc-shaped surface engaged by the roller on said intermediate lever, a link engaging said intermediate lever intermediate the ends thereof so as to rotate said intermediate lever about its floating pivot and thus move the roller on the free end of said intermediate lever along said arc-shaped surface toward and away from said second axis, an air-operated motor responsive to variations in a primary variable and connected to reciprocate said input lever about said first stationary axis, and a second air-operated motor responsive to variations in a tertiary variable and connected to said link to reciprocate said link and thereby to rotate said intermediate lever about its floating pivot and to move the roller on said intermediate lever along said arc-shaped surface.

4. An apparatus adjustable to vary the output produced by a given input, said apparatus including, a first air-operated motor movable in response to variations in a primary variable, an input lever pivoted on a first stationary axis, a driving connection between said first motor and said first lever, an intermediate lever having a floating pivotal connection with a free portion of said first lever and having its other end free, an output lever pivoted about a second stationary axis remote from said first stationary axis and engaged by the free end of said intermediate lever, a second air-operated motor responsive to variations in a tertiary variable, and a driving connection between said second motor and said intermediate lever whereby said intermediate lever is rotated about its floating pivot by said second motor so that the free end of said intermediate lever is moved along the arc-shaped surface of said output lever.

References Cited in the file of this patent

UNITED STATES PATENTS

| | | |
|---|---|---|
| 2,236,097 | Hubbard et al. | Mar. 25, 1941 |
| 2,257,905 | Gorrie | Oct. 7, 1941 |
| 2,314,152 | Mallory | Mar. 16, 1943 |
| 2,369,571 | Jones | Feb. 13, 1945 |
| 2,655,037 | Gess | Oct. 13, 1953 |
| 2,698,025 | Jordan | Dec. 28, 1954 |
| 2,706,084 | Gess | Apr. 12, 1955 |

FOREIGN PATENTS

| | | |
|---|---|---|
| 671,337 | Great Britain | Apr. 30, 1952 |